US012646334B2

(12) United States Patent
Burger et al.

(10) Patent No.: US 12,646,334 B2
(45) Date of Patent: Jun. 2, 2026

(54) SYSTEM AND VEHICLE

(71) Applicant: Vitesco Technologies GmbH, Regensburg (DE)

(72) Inventors: Katharina Burger, Regensburg (DE); Willibald Reitmeier, Hemau / Hohenschambach (DE); Daniel Luszek, Sinzing (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/846,788

(22) PCT Filed: Feb. 28, 2023

(86) PCT No.: PCT/EP2023/054937
§ 371 (c)(1),
(2) Date: Sep. 13, 2024

(87) PCT Pub. No.: WO2023/174670
PCT Pub. Date: Sep. 21, 2023

(65) Prior Publication Data
US 2025/0191377 A1      Jun. 12, 2025

(30) Foreign Application Priority Data

Mar. 15, 2022    (DE) ..................... 10 2022 202 531.8

(51) Int. Cl.
*G06V 20/58*      (2022.01)
*B60Q 1/24*       (2006.01)
(Continued)

(52) U.S. Cl.
CPC ............. *G06V 20/58* (2022.01); *B60Q 1/249* (2022.05); *G01S 17/894* (2020.01);
(Continued)

(58) Field of Classification Search
CPC ...... G06V 20/58; G06V 10/16; G06V 10/147; H04N 13/221; H04N 23/56; H04N 25/701;
(Continued)

(56) References Cited

U.S. PATENT DOCUMENTS 6,832,145 B2    12/2004   Takafuji
2005/0206510 A1*  9/2005  Weber ....................... B60R 1/30
                                                      348/148
(Continued)

FOREIGN PATENT DOCUMENTS

DE          10335757 A1     3/2005
DE      102015206453 A1    10/2016
(Continued)

OTHER PUBLICATIONS

Search Report for International Application No. PCT/EP2023/054937, 13 pages, May 15, 2023.
(Continued)

*Primary Examiner* — Thai Q Tran
*Assistant Examiner* — Jose M Mesa
(74) *Attorney, Agent, or Firm* — Slayden Grubert Beard PLLC

(57)                ABSTRACT

Various embodiments include a system for a vehicle having a body a door held on the body and pivotable about a pivot axis. An example includes: an obstacle identification system to detect a collision event occurring between the door and an object within surroundings of the vehicle; and a sensor pivotably held on the body, the sensor having a field of vision covering an angle about the pivot axis in plan view along the pivot axis. The field of vision covers a subregion of a total monitoring region of the obstacle identification system, wherein the field of vision is smaller than the total monitoring region.

18 Claims, 3 Drawing Sheets

(51) Int. Cl.

| | |
|---|---|
| *E05F 15/42* | (2015.01) |
| *G01S 17/894* | (2020.01) |
| *G01S 17/931* | (2020.01) |
| *G06T 3/4053* | (2024.01) |
| *G06V 10/10* | (2022.01) |
| *G06V 10/147* | (2022.01) |
| *H04N 13/221* | (2018.01) |
| *H04N 23/56* | (2023.01) |
| *H04N 25/701* | (2023.01) |

(52) U.S. Cl.

CPC .......... *G01S 17/931* (2020.01); *G06T 3/4053* (2013.01); *G06V 10/147* (2022.01); *G06V 10/16* (2022.01); *H04N 13/221* (2018.05); *E05F 15/42* (2015.01); *E05Y 2400/44* (2013.01); *E05Y 2900/531* (2013.01); *H04N 23/56* (2023.01); *H04N 25/701* (2023.01)

(58) Field of Classification Search

CPC ..... G01S 17/931; G01S 17/894; B60Q 1/249; G06T 3/4053; E05F 15/42; E05Y 2400/44; E05Y 2900/531

See application file for complete search history.

(56) References Cited

U.S. PATENT DOCUMENTS

| | | | |
|---|---|---|---|
| 2008/0060450 A1 | 3/2008 | Bischoff | |
| 2014/0365079 A1 | 12/2014 | Kaiser | |
| 2016/0024825 A1 | 1/2016 | Warschat | |
| 2019/0068829 A1* | 2/2019 | Van Schoyck ..... | G01C 21/1656 |
| 2021/0164721 A1* | 6/2021 | Grimminger ............ | G01P 1/07 |
| 2021/0254387 A1 | 8/2021 | Battlogg | |
| 2021/0293073 A1* | 9/2021 | Morosawa ............. | E05F 15/73 |

FOREIGN PATENT DOCUMENTS

| | | | |
|---|---|---|---|
| DE | 202017104192 | U1 | 8/2018 |
| DE | 102019103249 | A1 | 8/2019 |
| DE | 102018222197 | B3 | 6/2020 |
| EP | 2972480 | B1 | 1/2020 |
| WO | 2019182784 | A1 | 9/2019 |

OTHER PUBLICATIONS

Office Action for DE Application No. 10 2022 202 531.8, 5 pages, Oct. 25, 2022.

* cited by examiner

16 b2

24 l1

16 b2 l1

2"

z   y x

U 8     22'   20'        28'   30'

SYSTEM AND VEHICLE

CROSS-REFERENCE TO RELATED APPLICATIONS

This application is a U.S. National Stage Application of International Application No. PCT/EP2023/054937 filed Feb. 28, 2023, which designates the United States of America, and claims priority to DE Application No. 10 2022 202 531.8 filed Mar. 15, 2022, the contents of which are hereby incorporated by reference in their entirety.

TECHNICAL FIELD

The present disclosure relates vehicles. Some embodiments of the teachings herein include a vehicle with a vehicle body and a vehicle door, wherein the vehicle door is held on the vehicle body so as to be pivotable about a pivot axis.

BACKGROUND

Obstacle identification systems are used to prevent collisions with people or objects when manually or partially or fully automatically opening or closing a vehicle door or vehicle flap. For example, an opening movement can be aborted or an immediate (partial) closing movement, which is in the opposite direction to the opening movement, can be carried out if an obstacle is detected in the surroundings. A warning signal can also be emitted, for example, if opening a vehicle door would possibly lead to a collision with a static or moving object in the surroundings of the vehicle. This is intended to prevent personal injury, damage to objects, or damage to the vehicle itself.

Sensors for detecting an environment are often expensive and are only suitable to a limited extent for use in the near field of the vehicle. Against this background, the technical problem addressed by the present disclosure is that of specifying a system for a vehicle and a vehicle having such a system, which enable reliable and cost-effective obstacle identification, in particular in the near field or in the near range of the vehicle.

SUMMARY

The technical problems described above may be addressed by including a sensor with a restricted field of vision and/or with restricted resolution to a movable part of a vehicle in order to generate an increased monitoring range and/or an increased resolution by means of a pivoting movement of the sensor. For example, some embodiments of the teachings herein include a system for a vehicle, wherein the vehicle (2, 2') has a vehicle body (4) and a vehicle door (6), wherein the vehicle door (6) is held on the vehicle body (4) so as to be pivotable about a pivot axis (8), wherein the system (10) has: an obstacle identification system (12) designed to detect a collision event occurring between the vehicle door (6) and an object (14) within the surroundings (U) of the vehicle (2, 2'), having at least one sensor (16), the sensor (16) being pivotably held on the vehicle body (4), characterized in that the sensor (16) has a field of vision (20) which covers an angle (22) about the pivot axis (8) in plan view along the pivot axis (8), wherein the field of vision (20) covers a subregion of a total monitoring region (40) of the obstacle identification system (12), wherein the field of vision (20) is smaller than the total monitoring region (40).

In some embodiments, the sensor is secured in particular to the vehicle door (6) and can be pivoted together with the vehicle door (6) and/or the angle (22) about the pivot axis (8) is 45° or less, in particular, that the angle (22) is 25° or less, in particular 15° or less and/or the total monitoring region (40) corresponds to the sum of the angle (22) and a maximum opening angle (43) of the vehicle door (6) about the pivot axis (8) and/or the sensor is an optical sensor which has a low resolution, in particular 20,000 pixels or less, more particularly 10,000 pixels or less, more particularly 5,000 pixels or less.

In some embodiments, the sensor (16) is arranged on an outer face (18) of the vehicle door (6) facing the surroundings.

In some embodiments, the sensor (16) is an optical line sensor (16), wherein the sensor (16) has two or more pixels arranged next to each other in a line, in particular, that the sensor (16) has exactly one line or the sensor (16) has two or more lines, wherein in particular a sensor length (11) in the line direction corresponds at least to twice the sensor width (b1, b2) transversely to the line direction, in particular, that at least one line of the line sensor (16) is oriented substantially vertically or at least one line of the line sensor (16) is oriented substantially horizontally.

In some embodiments, the sensor (16) is assigned a light source (26), wherein a beam cone (28) of the light source (26) at least partially or completely covers the field of vision (20), in particular, that the light source (26) is secured to the outer face (18) of the vehicle door (6) facing the surroundings (U) and together with the vehicle door (6) is pivotably held on the vehicle body (4) and/or that a relative position of the light source (26) to the sensor (16) is fixed in advance and cannot be changed.

In some embodiments, a beam cone (28) of the light source (26), in plan view along the pivot axis (8), covers an angle (30) about the pivot axis (8), which, starting from the outer face (18) of the vehicle door, is 45° or less, in particular 25° or less, more particularly 15° or less and in particular substantially corresponds to the angle (22) of the field of vision (20).

In some embodiments, the sensor (16) is assigned a discrete evaluation electronics, such as a comparator, a phase evaluation function, a time-based evaluation or the like and/or a masking is provided, which limits the field of vision (22) of the sensor (16), in particular a mechanical masking, an electronic masking or a software-based masking.

In some embodiments, the obstacle identification system (12) comprises a control device (36) which is designed to capture sensor data during the pivoting of the vehicle door (6) for a plurality of angular positions of the vehicle door (6) and to assemble said data into a three-dimensional image of the surroundings (U).

In some embodiments, the distance between the angular positions is less than a pixel size and/or a pixel spacing of the sensor and the resolution of the image of the surroundings is greater than a sensor resolution.

As another example, some embodiments include a vehicle, wherein the vehicle (2, 2') has a vehicle body (4) and a vehicle door (6), the vehicle door (6) being pivotably held on the vehicle body (4), having a system (10) as described herein.

DETAILED DESCRIPTION

Figure 1:
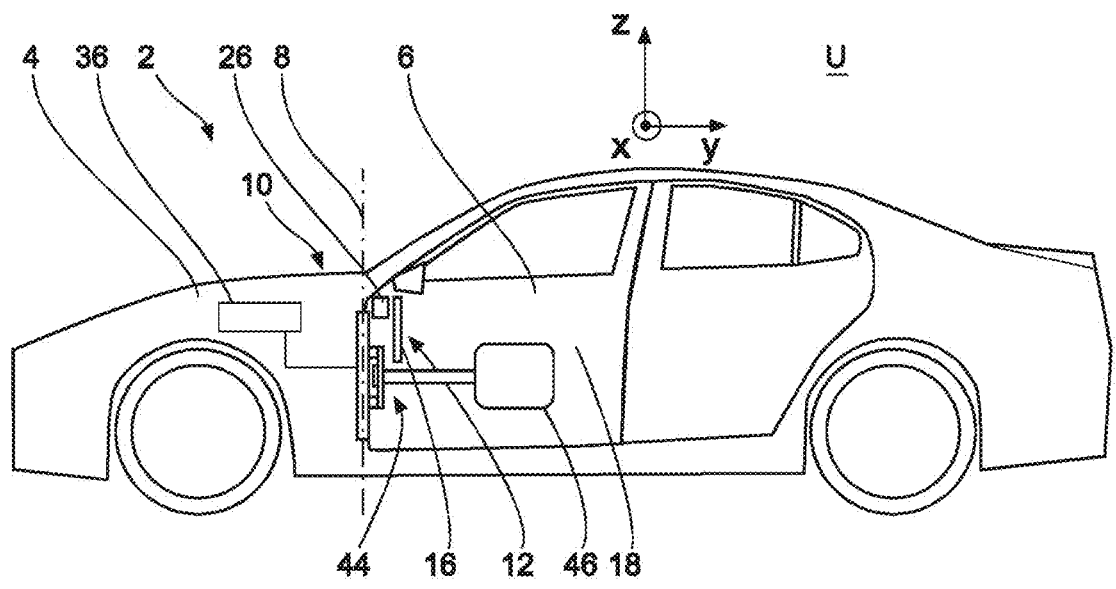
FIG. 1 shows a side view of a vehicle incorporating teachings of the present disclosure.

Some embodiments of the teachings herein include a system for a vehicle, wherein the vehicle has a vehicle body and a vehicle door, wherein the vehicle door is held on the vehicle body so as to be pivotable about a pivot axis, wherein the system has: an obstacle identification system designed to detect a collision event occurring between the vehicle door and an object in the surroundings of the vehicle, having at least one sensor, the sensor being secured in particular to the vehicle door and pivotably held on the vehicle body together with the vehicle door. The system is characterized in that the sensor has a field of vision which covers an angle about the pivot axis in plan view along the pivot axis, wherein the field of vision covers a subregion of a total monitoring region of the obstacle identification system, the field of vision being smaller than the total monitoring region. Thus, an obstacle identification system restricted to a near field of the vehicle door can be achieved in an immediate vicinity of the vehicle.

When the detection of a collision event occurring between the vehicle door and an object in the surroundings of the vehicle is referred to in the present disclosure, the term "detection" includes both the identification of an actually occurring collision event, that is to say the existence of a collision of an object with the vehicle door, as well as the identification of a possible imminent collision event in the future, in order to prevent such an event with appropriate countermeasures or warning functions.

The terms door and vehicle door are used synonymously here. When the present disclosure refers to a door or vehicle door, this also includes, in addition to the doors to the passenger compartment, all the flaps and covers of a vehicle, such as an engine hood, a trunk flap, a flap for covering a tank or charging interface or the like.

In some embodiments, the angle of the field of vision is 45° or less.

In some embodiments, the angle of the field of vision is 25° or less, in particular 15° or less. Thus, an obstacle identification system restricted to a near field of the vehicle door can be achieved.

The total monitoring region can correspond to the sum of the angle and a maximum opening angle of the vehicle door about the pivot axis.

The sensor may be located on an outer face of the vehicle door facing the surroundings. The sensor may be arranged in the vehicle interior, for example behind a window or a viewing window in order to monitor the environment.

In some embodiments, a portion of the sensor monitors an outer face of an assigned door and that another portion of the same sensor monitors an inner face of the assigned door.

In some embodiments, the sensor is an optical sensor having exactly one pixel. The sensor can be an optical sensor which has a low resolution, in particular 20,000 pixels or less, more particularly 10,000 pixels or less, more particularly 5,000 pixels or less. This enables reliable environmental monitoring to be achieved by means of a cost-effective sensor.

In some embodiments, only a subset of the pixels of an optical sensor are used for obstacle identification, in particular less than 50% of the pixels are used, more particularly less than 25% of the pixels are used, even more particularly less than 10% of the pixels are used.

The sensor can be a triangulation sensor. The sensor can be camera-based. The sensor can be a non-optical sensor, in particular a radar sensor. Therefore, measurement systems based on geometric measurement principles can be used, such as the triangulation sensor, or measuring systems for which the distance measurement uses phase-based or time-based measurement principles.

In some embodiments, the sensor is an optical line sensor, wherein the sensor has two or more pixels, which are arranged in a row. The sensors can be C-MOS or SPAD sensors, for example.

In some embodiments, the sensor has exactly one line or the sensor has two or more lines, wherein in particular a sensor length in the line direction corresponds at least to twice the sensor width transversely to the line direction.

In some embodiments, at least one line of the line sensor is oriented substantially vertically. In some embodiments, at least one line of the line sensor is oriented substantially horizontally.

In some embodiments, the sensor is assigned a light source, wherein a beam cone of the light source at least partially or completely covers the field of vision of the sensor.

In some embodiments, the light source is secured to the outer face of the vehicle door facing the surroundings and is pivotably held on the vehicle body together with the vehicle door. In some embodiments, a relative position of the light source to the sensor is fixed in advance and cannot be changed.

Depending on the measuring principle, the light source may be a broadband or narrowband light source, in particular an LED or laser light source, e.g. in the invisible range (UV, NIR), which can be used in a modulated or non-modulated manner.

In some embodiments, a beam cone of the light source, in plan view along the pivot axis, covers an angle about the pivot axis, which, starting from the outer face of the vehicle door, is 45° or less, in particular 25° or less, more particularly 15° or less and in particular substantially corresponds to the angle of the field of vision.

The beam cone, which is limited to 45° or less, 25° or less or 15° or less, enables a locally increased illumination intensity within the statutory and/or standardized specifications. In some embodiments, an illumination intensity of the light source is increased or decreased depending on the ambient conditions of the vehicle.

In some embodiments, the sensor is assigned a discrete evaluation electronics, such as a comparator, a phase evaluation function, a time-based evaluation or the like. This ensures a cost-effective and robust sensor operation. In some embodiments, an optical masking can be provided which limits the field of vision of the sensor, in particular a mechanical masking, an electronic masking or a software-based masking. A mechanical masking can be a screen or the like to cover a portion of the sensor. Software-based masking can limit an evaluation to data from a specific sensor region. Electronic masking can be achieved, for example, by reading out only specific regions, lines or pixels of the sensor.

A door drive may be assigned to the vehicle door, wherein the door drive is designed for partially automatic or fully automatic pivoting of the vehicle door. The door drive can therefore assist in or can completely automatically carry out the opening and/or closing of the vehicle door. In particular, the door drive may have a motor for partially automatic or fully automatic pivoting of the vehicle door. In particular, the motor can be assigned mechanical components for the translation or reduction of the motor movement, such as a spindle operation or similar. It goes without saying that the motor may also be embodied as a direct drive.

The sensor may be designed for one-dimensional, two-dimensional, or three-dimensional identification of the surroundings and/or for measuring distances.

In some embodiments, the obstacle identification system is assigned a control device, wherein the control device has, for example, the following function: door assistance, wherein one or more of the following functions are triggered in the event of detection of a collision event: emitting a warning signal; limiting an opening distance of the door; initiating countermeasures; blocking or releasing the door in a door angle position, a door opening position or a door closing position.

The obstacle identification system can comprise a control device which is designed to capture sensor data during the pivoting of the vehicle door for a plurality of angular positions of the vehicle door and to assemble said data into a three-dimensional image of the surroundings. Thus, a three-dimensional image of the surroundings can be generated, in particular with a low-resolution sensor, in which a pivoting movement of the vehicle door is used to "scan" the surroundings.

The distance between the angular positions can be less than a pixel size and/or a pixel spacing of the sensor so that the resolution of the image of the surroundings is greater than a sensor resolution. Therefore, a plurality of images of the surroundings can be superimposed and evaluated, so that a resolution of the surroundings image that is larger than a native resolution of the sensor can be generated due to a pivoting movement of the door.

Some embodiments include a vehicle, wherein the vehicle has a vehicle body and a vehicle door, wherein the vehicle door is held pivotably on the vehicle body, having a system as described herein.

In some embodiments, at least two doors of the vehicle are monitored using the system, wherein at least one sensor is assigned to each one of the at least two doors. In some embodiments, a sensor is designed for monitoring or partial monitoring of two doors.

In some embodiments, the sensor sits on a movable device of the vehicle, such as an exterior mirror or the like, or on an actuator provided specifically for the sensor. In particular, it may be provided that the movable device is intended to follow a door opening or to carry out a movement proportional to the door opening.

FIG. 1 shows a side view of a vehicle 2 incorporating teachings of the present disclosure. The vehicle 2 has a vehicle body 4 and a vehicle door 6, wherein the vehicle door 6 is held on the vehicle body 4 so as to be pivotable about a pivot axis 8.

The vehicle 2 comprises a system 10 incorporating teachings of the present disclosure, which has an obstacle identification system 12. The obstacle identification system 12 is designed to detect a collision event occurring between the vehicle door 6 and an object 14 within the surroundings U of the vehicle 2. The obstacle identification system 12 has a sensor 16, wherein the sensor 16 is secured to an outer face 18 of the vehicle door 6 facing the surroundings U and is pivotably held on the vehicle body 4 together with the vehicle door 6.

The sensor 16 has a field of vision 20, which, viewed in a plan view (FIG. 2) along the pivot axis 8, covers an angle 22 about the pivot axis 8, which is 45° starting from the outer face of the vehicle door.

Figures 5, 6, 7:
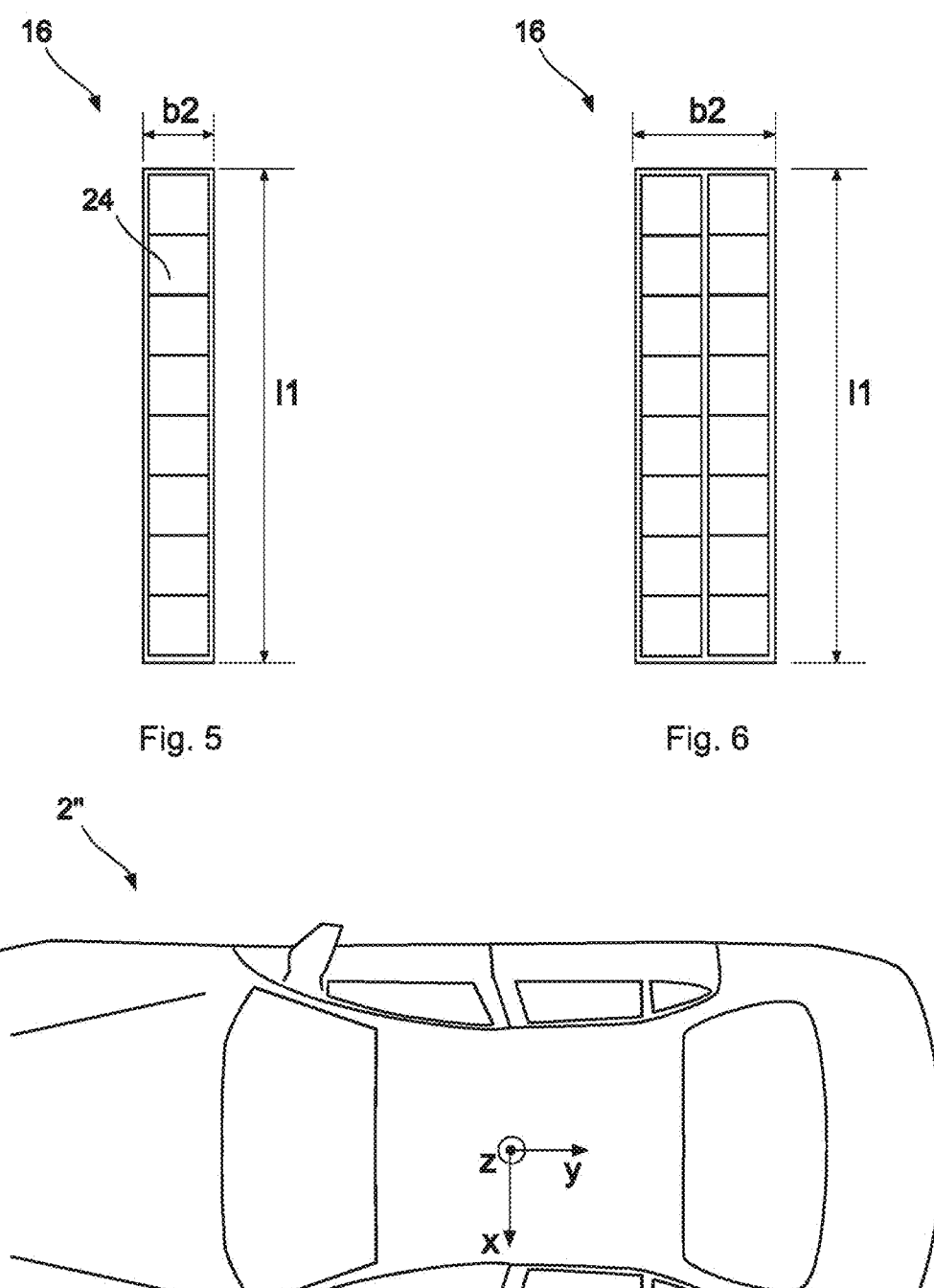
FIG. 5 shows a line sensor incorporating teachings of the present disclosure.
FIG. 6 shows a further line sensor incorporating teachings of the present disclosure.
FIG. 7 shows a plan view of a further vehicle incorporating teachings of the present disclosure.

The sensor 16 is an optical line sensor. The sensor 16 has two or more pixels 24, which are arranged, for example, in a single row (FIG. 5) or double row (FIG. 6), i.e. in one line (FIG. 5) or in two lines (FIG. 6). In some embodiments, the sensor 16 may have more than two lines.

The sensor length 11 in the line direction corresponds at least to twice the sensor width b2 transversely to the line direction. The sensor 16 can be oriented substantially vertically so that the sensor length 11 extends along the z-direction shown in FIGS. 1-4.

Figure 2:
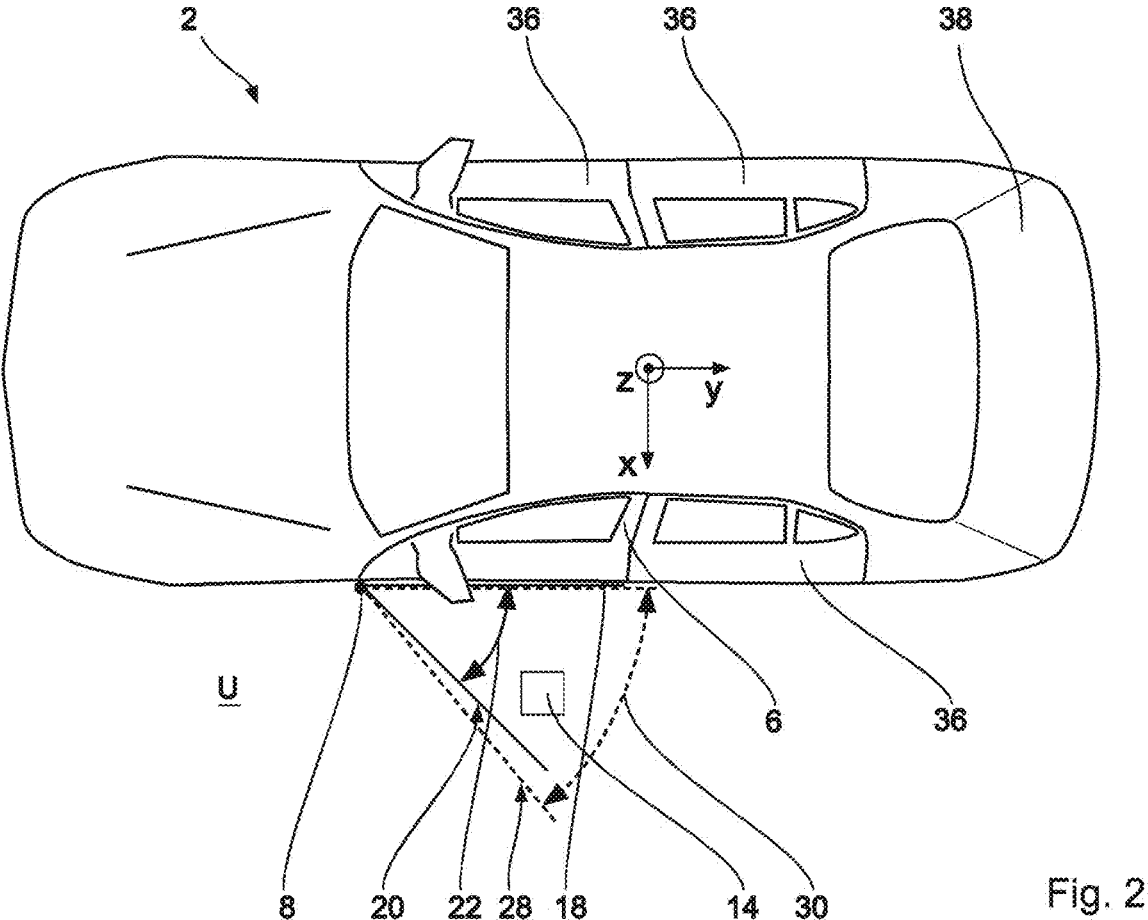
FIG. 2 shows a plan view of the vehicle from FIG. 1.

The sensor 16 is assigned a light source 26, wherein a beam cone 28 of the light source 26, which in FIG. 2 is bounded by the dashed lines, completely covers the field of vision 20 (FIG. 2). The light source 26 is also secured to the outer face 18 of the vehicle door 6 facing the surroundings U and is pivotably held on the vehicle body 4 together with the vehicle door 6. A relative position of the light source 26 to the sensor 16 is fixed in advance and cannot be changed.

The beam cone 28 of the light source 26 covers, in plan view along the pivot axis 8 (FIG. 2), an angle 30 about the pivot axis 8, which in this case is approximately 50° starting from the outer face 18 of the vehicle door 6.

The line sensor 16 is in particular a distance sensor, which can detect a distance of an object 14 from the vehicle door 6.

The system 10 has a control device 36 assigned to the obstacle identification system 12, which processes signals of the sensor 16.

A door drive 44 is assigned to the vehicle door 6 (FIG. 1), wherein the door drive 44 is designed for partially automatic or fully automatic pivoting of the vehicle door 6. The door drive 44 has a motor 46 for the partially automatic or fully automatic pivoting of the vehicle door 6.

The vehicle 2 has three further doors 36 and a trunk flap 38, each of which can be assigned its own obstacle identification system, which can be implemented in each case in a comparable manner to the obstacle identification system 12.

Figures 3, 4:
FIG. 3 shows a plan view of the vehicle from FIG. 1 with the driver's door open.
FIG. 4 shows a plan view of a further vehicle incorporating teachings of the present disclosure.

FIG. 3 shows the vehicle 2 with the driver's door 6 open. Because the sensor 16 together with the vehicle door 6 is pivotable about the pivot axis 8, the sensor 16 covers a total monitoring region 40, which, in plan view along the pivot axis 8, covers an angle 42 about the pivot axis 8 which is greater than 90°. In particular, the total measuring range 40 is given by the sum of a maximum opening angle 43 of the vehicle door 6 and the angle 22.

FIG. 4 shows a further exemplary embodiment of a vehicle 2' incorporating teachings of the present disclosure, wherein only the differences relative to the above described embodiment are discussed below and identical reference signs are assigned to the same features.

The embodiment according to FIG. 4 differs from the embodiment according to FIG. 2 in that the sensor 16 covers a field of view 20' with a smaller angle 22' and also an angle 30' of a beam cone 28' of the light source 26 is likewise smaller. The angles 22' and 30' are approximately 15° each.

FIG. 7 shows a further exemplary embodiment of a vehicle 2″ incorporating teachings of the present disclosure, wherein only the differences relative to the exemplary embodiments described above are discussed below and identical reference signs are assigned to the same features.

The embodiment according to FIG. 7 differs from the embodiments according to FIG. 2 and FIG. 4 in that the sensor 16 covers a field of view 20″ with an inward facing angle 22″ and also an angle 30″ of a beam cone 28″ of the light source 26 is facing inwards.

In some embodiments, a sensor is provided for monitoring both an interior and an exterior region of a vehicle door. In some embodiments, two or more sensors are provided for monitoring both an interior and an exterior region of a vehicle door.

What is claimed is:

1. A system for a vehicle having a body a door held on the body and pivotable about a pivot axis, the system comprising:
   an obstacle identification system to detect a collision event occurring between the door and an object within surroundings of the vehicle;
   a sensor pivotably held on the body, the sensor having a field of vision covering an angle about the pivot axis in plan view along the pivot axis;
   wherein the field of vision covers a subregion of a total monitoring region of the obstacle identification system, wherein the field of vision is smaller than the total monitoring region;
   the sensor is secured to the door and can pivot together with the vehicle door;
   the angle about the pivot axis is 45° or less;
   the total monitoring region corresponds to a sum of the angle and a maximum opening angle of the door about the pivot axis; and/or
   the sensor comprises an optical sensor with a resolution of 20,000 pixels or less.

2. The system as claimed in claim 1, wherein the sensor is arranged on an outer face of the door facing the surroundings.

3. The system as claimed in claim 1, wherein:
   the sensor comprises an optical line sensor with two or more pixels arranged next to each other in a line; and
   a sensor length in the line direction corresponds at least to twice a sensor width transverse to the line direction.

4. The system as claimed in claim 1, wherein:
   the sensor is assigned a light source;
   a beam cone of the light source at least partially covers the field of vision; and/or
   a relative position of the light source to the sensor is fixed in advance and cannot be changed.

5. The system as claimed in claim 4, wherein a beam cone of the light source, in plan view along the pivot axis, covers an angle about the pivot axis, which, starting from the outer face of the vehicle door, is 45° or less.

6. The system as claimed in claim 1, wherein:
   the sensor is assigned a discrete evaluation electronics; and/or
   a masking limits the field of vision of the sensor.

7. The system as claimed in claim 1, wherein the obstacle identification system comprises a control device to capture sensor data during the pivoting of the vehicle door for a plurality of angular positions of the vehicle door and to assemble said data into a three-dimensional image of the surroundings.

8. The system as claimed in claim 7, wherein a distance between the angular positions is less than a pixel size and/or a pixel spacing of the sensor and the resolution of the image of the surroundings is greater than a sensor resolution.

9. A vehicle comprising:
   a body;
   a door pivotably held on the body;
   an obstacle identification system to detect a collision event occurring between the door and an object within surroundings of the vehicle; and
   a sensor pivotably held on the body, the sensor having a field of vision covering an angle about the pivot axis in plan view along the pivot axis;
   wherein the field of vision covers a subregion of a total monitoring region of the obstacle identification system, wherein the field of vision is smaller than the total monitoring region;
   the sensor is secured to the door and can pivot together with the vehicle door;
   the angle about the pivot axis is 45° or less;
   the total monitoring region corresponds to a sum of the angle and a maximum opening angle of the door about the pivot axis; and/or
   the sensor comprises an optical sensor with a resolution of 20,000 pixels or less.

10. The vehicle as claimed in claim 9, wherein the sensor is arranged on an outer face of the door facing the surroundings.

11. The vehicle as claimed in claim 9, wherein:
   the sensor comprises an optical line sensor with two or more pixels arranged next to each other in a line; and
   a sensor length in the line direction corresponds at least to twice a sensor width transverse to the line direction.

12. The vehicle as claimed in claim 9, wherein:
   the sensor is assigned a light source;
   a beam cone of the light source at least partially covers the field of vision; and/or
   a relative position of the light source to the sensor is fixed in advance and cannot be changed.

13. The vehicle as claimed in claim 12, wherein a beam cone of the light source, in plan view along the pivot axis, covers an angle about the pivot axis, which, starting from the outer face of the vehicle door, is 45° or less.

14. The vehicle as claimed in claim 9, wherein:
   the sensor is assigned a discrete evaluation electronics; and/or
   a masking limits the field of vision of the sensor.

15. The vehicle as claimed in claim 9, wherein the obstacle identification system comprises a control device to capture sensor data during the pivoting of the vehicle door for a plurality of angular positions of the vehicle door and to assemble said data into a three-dimensional image of the surroundings.

16. The vehicle as claimed in claim 15, wherein a distance between the angular positions is less than a pixel size and/or a pixel spacing of the sensor and the resolution of the image of the surroundings is greater than a sensor resolution.

17. A system for a vehicle having a body a door held on the body and pivotable about a pivot axis, the system comprising:
   an obstacle identification system to detect a collision event occurring between the door and an object within surroundings of the vehicle;
   a sensor pivotably held on the body, the sensor having a field of vision covering an angle about the pivot axis in plan view along the pivot axis;

wherein the field of vision covers a subregion of a total monitoring region of the obstacle identification system, wherein the field of vision is smaller than the total monitoring region;

the sensor comprises an optical line sensor with two or more pixels arranged next to each other in a line; and a sensor length in the line direction corresponds at least to twice a sensor width transverse to the line direction.

18. A system for a vehicle having a body a door held on the body and pivotable about a pivot axis, the system comprising:

an obstacle identification system to detect a collision event occurring between the door and an object within surroundings of the vehicle;

a sensor pivotably held on the body, the sensor having a field of vision covering an angle about the pivot axis in plan view along the pivot axis;

wherein the field of vision covers a subregion of a total monitoring region of the obstacle identification system, wherein the field of vision is smaller than the total monitoring region; and the obstacle identification system comprises a control device to capture sensor data during the pivoting of the vehicle door for a plurality of angular positions of the vehicle door and to assemble said data into a three-dimensional image of the surroundings.

* * * * *